US011307958B2

(12) United States Patent
Zheng et al.

(10) Patent No.: US 11,307,958 B2
(45) Date of Patent: Apr. 19, 2022

(54) DATA COLLECTION IN TRANSACTION PROBLEM DIAGNOSTIC

(71) Applicant: INTERNATIONAL BUSINESS MACHINES CORPORATION, Armonk, NY (US)

(72) Inventors: Xin Zheng, Beijing (CN); Si Bin Fan, Beijing (CN); Xue Yong Zhang, Beijing (CN); Li Xiang, Beijing (CN); Li Li, Beijing (CN); Ting Xie, Beijing (CN); Chang Zhi GZ Zhang, Beijing (CN); Yan Wang, Beijing (CN); Hai He, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 14 days.

(21) Appl. No.: 16/135,025

(22) Filed: Sep. 19, 2018

(65) Prior Publication Data

US 2020/0089593 A1   Mar. 19, 2020

(51) Int. Cl.
*G06F 11/34* (2006.01)
*G06F 11/14* (2006.01)
*G06F 11/07* (2006.01)
*G06F 16/18* (2019.01)

(52) U.S. Cl.
CPC ...... *G06F 11/3476* (2013.01); *G06F 11/0745* (2013.01); *G06F 11/1402* (2013.01); *G06F 11/3419* (2013.01); *G06F 16/1865* (2019.01); *G06F 2201/87* (2013.01)

(58) Field of Classification Search
CPC ............ G06F 11/0745; G06F 11/1402; G06F 11/3466; G06F 11/3476; G06F 2201/84
See application file for complete search history.

(56) References Cited

U.S. PATENT DOCUMENTS

| 9,639,446 B2 | 5/2017 | Wright et al. | |
|---|---|---|---|
| 10,049,027 B2* | 8/2018 | Burghard | G06F 11/0709 |
| 2008/0058961 A1* | 3/2008 | Biberdorf | G06F 11/0709 700/5 |
| 2009/0070743 A1* | 3/2009 | Alfors | G06F 11/3604 717/125 |
| 2009/0106741 A1* | 4/2009 | Dageville | G06F 11/3636 717/128 |
| 2009/0172689 A1* | 7/2009 | Bobak | G06F 9/5061 718/104 |
| 2012/0204156 A1 | 8/2012 | Kettley et al. | |
| 2012/0331135 A1* | 12/2012 | Alon | H04L 41/044 709/224 |
| 2013/0145015 A1* | 6/2013 | Malloy | H04L 67/025 709/224 |

(Continued)

*Primary Examiner* — Tuan V Thai
(74) *Attorney, Agent, or Firm* — Edward Wixted, Esq.; Blanche E. Schiller, Esq.; Heslin Rothenberg Farley & Mesiti P.C.

(57) ABSTRACT

Data collection is provided, in which one or more affected transactions related to one or more transaction exceptions are determined. Based on one or more features of the one or more affected transactions, one or more trace features are determined. Based on the one or more trace features, a data collection rule is generated. Data of a subsequent transaction complying with the data collection rule is collected.

20 Claims, 6 Drawing Sheets

(56) References Cited

U.S. PATENT DOCUMENTS

| | | | | |
|---|---|---|---|---|
| 2013/0283281 A1* | 10/2013 | Krajec | ................ | G06F 11/3433 |
| | | | | 718/102 |
| 2013/0346806 A1* | 12/2013 | Burghard | ............ | G06F 11/3072 |
| | | | | 714/45 |
| 2015/0186245 A1* | 7/2015 | Hoen, IV | ................ | H04L 43/04 |
| | | | | 714/45 |
| 2016/0266961 A1* | 9/2016 | Beard | .................. | G06F 11/3636 |
| 2016/0321159 A1* | 11/2016 | Romm | .................. | G06F 11/364 |

\* cited by examiner

DATA COLLECTION IN TRANSACTION PROBLEM DIAGNOSTIC

BACKGROUND

One or more aspects of the present invention relate to data processing, and more specifically, to data collection in the transaction problem diagnostic.

A transaction may symbolize a unit of work, which can be performed within a database system for satisfying a service request and ensuring database integrity. With the wide application of transaction processing systems, such as stock exchange systems, online purchasing systems, and bank transaction systems, etc., problem diagnostic in these systems becomes more and more important.

SUMMARY

According to one embodiment, there is provided a computer-implemented method of data collection. According to one embodiment, one or more affected transactions related to one or more transaction exceptions are determined, and one or more trace features are determined based on one or more features of the one or more affected transactions. A data collection rule is generated based on the one or more trace features. Data of a subsequent transaction complying with the data collection rule is collected.

According to another embodiment, there is provided a computer system for data collection. The computer system comprises a processor and a memory coupled to the processor. The computer system is configured to perform a method including determining one or more affected transactions related to one or more transaction exceptions, and determining one or more trace features based on one or more features of the one or more affected transactions. Based on the one or more trace features, a data collection rule is generated, and data of a subsequent transaction complying with the data collection rule is collected.

According to another embodiment, there is provided a computer program product for data collection. The computer program product comprises a computer readable storage medium having program instructions embodied therewith. The program instructions are executable by a processor to perform a method. The method includes determining one or more affected transactions related to one or more transaction exceptions, and based on one or more features of the one or more affected transactions, determining one or more trace features. Based on the one or more trace features, a data collection rule is generated, and data of a subsequent transaction complying with the data collection rule is collected.

BRIEF DESCRIPTION OF THE DRAWINGS

Through the more detailed description of some embodiments of the present disclosure in the accompanying drawings, the above and other objects, features and advantages of aspects of the present disclosure will become more apparent, wherein the same reference generally refers to the same components in the embodiments of the present disclosure.

DETAILED DESCRIPTION

Figure 1:
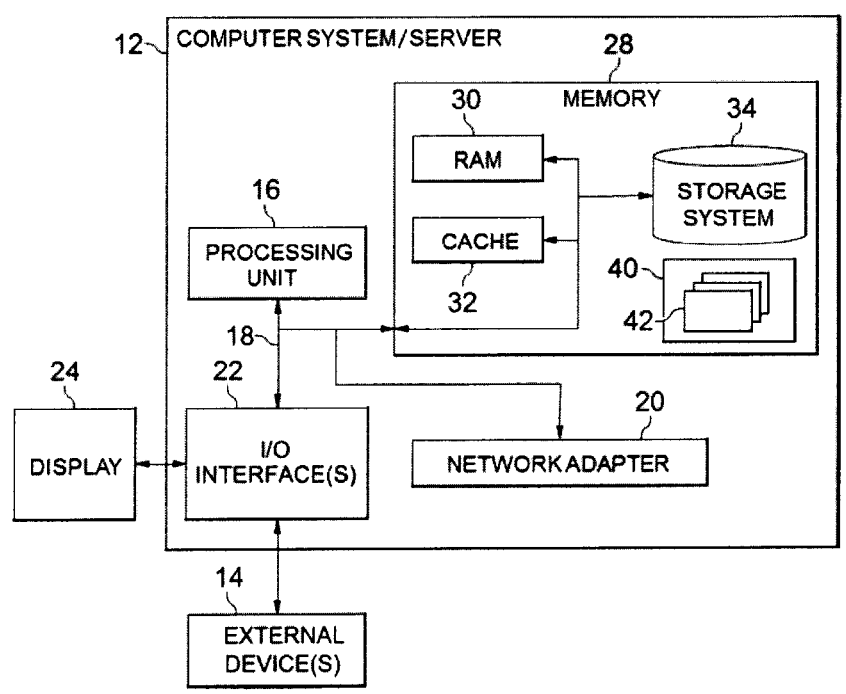
FIG. 1 depicts a cloud computing node used in accordance with one or more aspects of the present invention.

Some embodiments will be described in more detail with reference to the accompanying drawings, in which the embodiments have been illustrated. However, aspects of the present disclosure can be implemented in various manners, and thus should not be construed to be limited to the embodiments disclosed herein.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
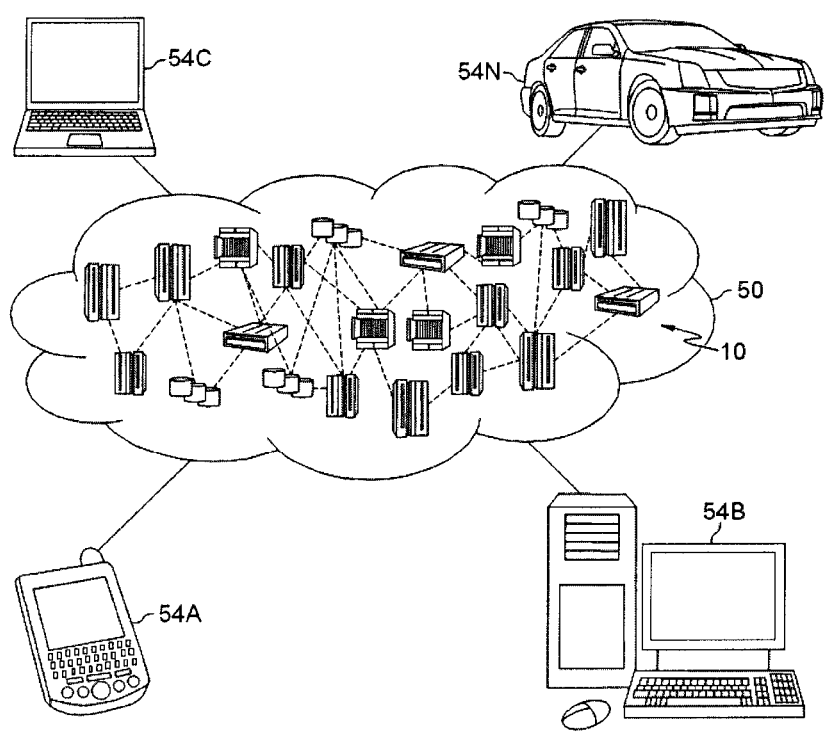
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
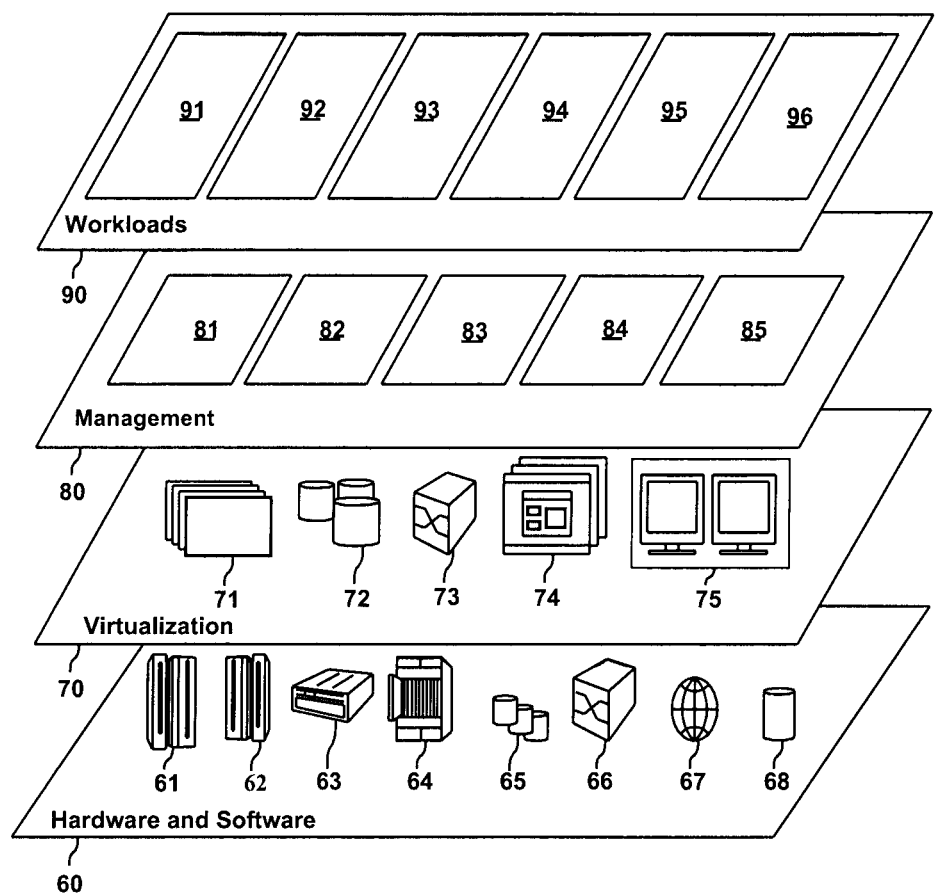
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data collection 96.

Transaction problem diagnostic is becoming more and more important. However, it is difficult to trace useful data of transactions because transaction problems usually happen on high volume workloads. Besides, data collection in transaction problem diagnostic would be resource consuming and time consuming.

In some approaches, for implementing transaction problem diagnostic, an administrator of a transaction system can enable a trace when a transaction exception occurs, wait for completion of the trace, and then disable the trace. A problem diagnostic expert can analyze data collected during the trace and determine a failure reason of the transaction exception. However, the collected data would be very huge and complex, as the data may be collected from cross systems and products, and the analysis workload would be very heavy. This may lead to poor performances of the transaction system, bad user experiences, and large resource consuming.

Embodiments of the present invention provide a data collection mechanism for transaction problem diagnosis. The provided data collection mechanism may be implemented in any now-known or to be developed transaction system.

Figure 4:
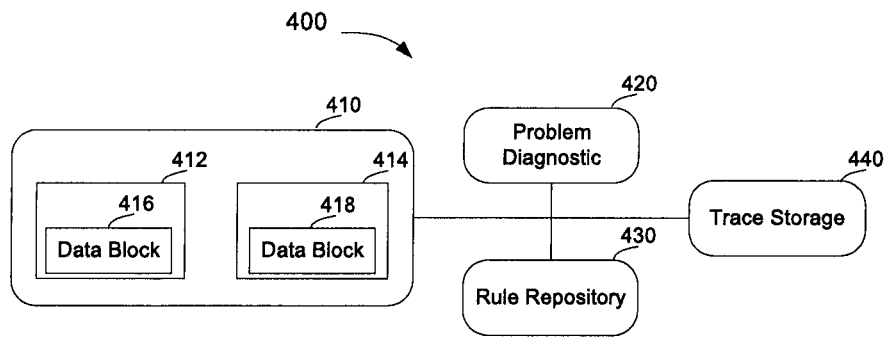
FIG. 4 depicts one embodiment of a schematic diagram of an example transaction system, in accordance with one or more aspects of the present invention.

FIG. 4 depicts a schematic diagram of an example transaction system 400 according to an embodiment of the present invention. Transaction system 400 is comprised, in one embodiment, in cloud computing node 10 in FIG. 2. As shown in FIG. 4, transaction system 400 includes, for instance, a transaction processing module 410, a problem diagnostic module 420, a rule repository 430, and a trace storage 440. Transaction processing module 410 processes, e.g., one or more transactions, such as transaction 412 and transaction 414, etc. Transaction processing module 410 is, for instance, a transaction server, a message processing system, or a database, etc. Transaction 412 and transaction 414 respectively corresponds to a data block, such as data block 416 and data block 418. Problem diagnostic module 420 is used, in one example, to provide a data collection function. Rule repository 430 is used, in one example, to store rules for data collection, and trace storage 440 is used, in one example, to store the collected data of transactions. It shall be understood that the above-mentioned modules are just for describing principles of aspects of the present invention, and aspects of the present invention are not limited to transaction system 400 comprising only these modules. Other modules can also be comprised, and one or more of the above-mentioned modules can be combined with another module or divided into a plurality of sub-modules.

Figure 5:
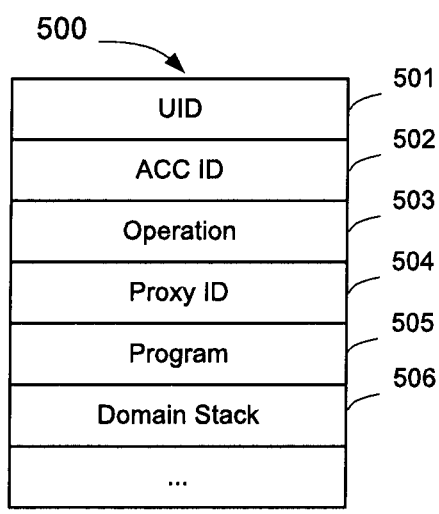
FIG. 5 depicts a schematic diagram of an example data block according to an embodiment of the present invention.

Referring now to FIG. 5, an example data block 500 related to a transaction according to an embodiment of the present invention is depicted. Example data block 500 is used, in one example, by transaction system 400 to execute a transaction. Data block 416 and data block 418 in FIG. 4 has a structure similar to data block 500, in one embodiment. As shown in FIG. 5, data block 500 includes, for instance, one or more data fields, such as User Identifier (UID) 501, Account Identifier (ACC ID) 502, Operation 503, Proxy Identifier (Proxy ID) 504, Program 505, and/or Domain Stack 506, etc. It shall be understood that other data fields may also be comprised in data block 500, such as Filename indicating files used by a transaction (not shown in FIG. 5), and Address of a transaction (not shown in FIG. 5), etc. These data fields can be organized in any suitable manner or sequence to form data block 500. As an example, the data block related to a transaction can be a Task Control Block (TCB). It shall be understood that the data block can also be other types of data block.

According to embodiments of the present invention, one or more transaction exceptions may occur during execution of transactions in transaction processing module 410, and one or more affected transactions related to the one or more transaction exceptions can be detected by problem diagnostic module 420. The execution exceptions include, for instance, transaction recovery, transaction rollback, database rollback, program abend, and/or transaction logical failure, etc. It shall be understood that the execution exceptions may also comprise other types of transaction failure. The one or more affected transactions comprise transactions which are not executed successfully due to the one or more execution exceptions.

Figure 6:
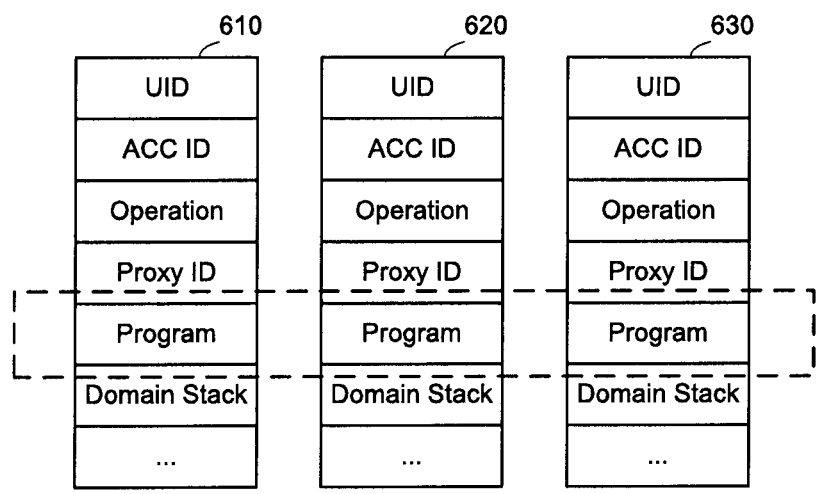
FIG. 6 depicts a schematic diagram of a plurality of example data blocks according to an embodiment of the present invention.

Data blocks related to the one or more affected transactions are determined, in one example, by problem diagnostic module 420. Referring now to FIG. 6, a plurality of data blocks according to an embodiment of the present invention are depicted. Data block 610, data block 620 and data block 630 respectively corresponds to an affected transaction, such as Transaction 1, Transaction 2, and Transaction 3. Data block 610, data block 620 and data block 630 respectively comprises one or more data fields, including but not limited to: UID, ACC ID, Operation, Proxy ID, Program, Domain Stack, Filename, and/or Address, etc.

In some embodiments, one or more features of the one or more affected transactions comprise at least one of: user identifiers, account identifiers, operations, proxy identifiers, programs, domain stacks, filenames, and addresses, etc. related to the one or more affected transactions. A feature of a transaction may comprise a name of a data field and a value of the data fields. As an example, if values of data field UID in data block 610, data block 620 and data block 630 comprise "uid1", "uid2" and "uid3" respectively, then features of Transaction 1, Transaction 2, and Transaction 3 can comprise "UID=uid1", "UID=uid2" and "UID=uid3" respectively. In this example, the symbol "=" indicates values "uid1", "uid2", and "uid3" are assigned to the data field "UID" respectively.

According to embodiments of the present invention, one or more trace features are determined based on one or more features of the one or more affected transactions by problem diagnostic module 420.

In some embodiments, the one or more trace features are determined, for instance, based on one or more same or similar features of a plurality of affected transactions related to the one or more execution exceptions. For example, values of data field "Program" of data block 610, data block 620 and data block 630 may be the same, and Transaction 1, Transaction 2, and Transaction 3 may have the same feature "Program=program123". Then, the feature "Program=program123" shared by Transaction 1, Transaction 2, and Transaction 3 can be used as a trace feature.

In some embodiments, one or more successful transactions that occur concurrently with the one or more affected transactions are also detected. One or more features of the one or more affected transactions that are different from one or more corresponding features of the one or more successful transactions are determined, in one example, as the one or more trace features. For example, Transaction processing module 410 detects a successful transaction "Transaction 4" in parallel with the affected transactions "Transaction 1, Transaction 2, and Transaction 3". Transaction 4 comprises one or more data fields (such as data field UID, ACC ID, Operation, Proxy ID, Program, Domain Stack, Filename, and/or Address, etc.) in a data block related to Transaction 4. In this example, Transaction 1, Transaction 2, and Transaction 3 share a same feature "Operation=operation1", which is different from the corresponding feature "Operation=operation2" of Transaction 4. Feature "Operation=operation1" of Transaction 1, Transaction 2, and Transaction 3 is used, in one example, as a trace feature.

In some embodiments, the one or more trace features can also be determined based on inputs from a user or an administrator of transaction system 400. For example, one or more features of Transaction 1, Transaction 2, or Transaction 3 are displayed to the user or the administrator through a user interface provided by transaction system 400, and inputs from the user or the administrator indicating which features to be used as trace features are received, in one example, through an input device provided by transaction system 400. Problem diagnostic module 420 then determines, in one example, the trace features according to the received inputs.

In some embodiments, available resources for data collection can be predicted. Resources requested for tracing subsequent transactions having different sets of features can be predicted too, and each of the different sets of features comprises one or more trace features determined based on the one or more features of the one or more affected transactions. If predicted resources requested for tracing subsequent transactions having a set of features can be satisfied by the available resources, the set of features can be used as the trace features. The available resources may comprise processing resources, and/or storage resources, etc.

As an example, a set of features is determined, for instance, based on the features of Transaction 1, Transaction 2, or Transaction 3 using the above-mentioned techniques. In this example, available resources for data collection are predicted, for instance, based on history or current available resources. Resources requested for tracing subsequent transactions having Feature Set 1 (feature "Operation=operation1"), Feature Set 2 (features "UID=uid1" & "Operation=operation1"), or Feature Set 3 (features "UID=uid1" & "ACC ID=accid1" & "Operation=operation1"), etc. are predicted, for example, based on history resources consumption by tracing history transactions having Feature Sets 1-3. If a predicted resource requested for tracing subsequent transactions having Feature Set 1 can be satisfied by the predicted available resources, Feature Set 1 (feature "Operation=operation1") can be used as be the trace features. In other examples, a set of features may comprise more than one feature, such as Feature Set 2 or Feature Set 3.

According to embodiments of the present invention, a data collection rule is generated by problem diagnostic module 420 based on the one or more trace features. The generated rule is recorded, for instance, in rule repository 430, which can be accessed by problem diagnostic module 420. The generated rule includes, in one example, one or more trace features. Table 1 is an example table recording the generated rules. As an example, for Rule 1, the trace feature is "Program=program123". According to Rule 1, if a subsequent transaction comprises a data field "Program" in its related data block, and the value of the data field "Program" is assigned with "program123", the subsequent transaction can be traced. In this example, Rule 1, 2, 3, and 4 may respectively include different number of trace features.

TABLE 1

| Rule | Trace Feature(s) |
|------|------------------|
| 1 | Program=program123 |
| 2 | Operation=operation1 |
| 3 | Address=192.168.0.11 |
| 4 | UID=uid1 & Operation= operation1 |
| ... | ... |

In some embodiments, a time slot is determined for the data collection rule, the data collection rule includes the time slot, and data of a subsequent transaction complying with the data collection rule is collected during the time slot.

For example, a preset time slot is configured for transaction system 400, and in one example, data trace is only implemented during this preset time slot. The time slot can also be determined by analyzing history workload of transaction system 400, and a time period during which transaction system 400 has enough free resources can be set as the time slot for the data collection rule. As another example, a user of transaction system 400 can set a time slot for a data collection rule, and the trace of subsequent transactions according to the data collection rule can only be valid during the time slot.

Table 2 shows one example of a plurality of rules comprising time slots. As an example, for rule 1, the time slot is "0:00-3:00, every day", which means data collection according to Rule 1 can be implemented during 0:00-3:00 of every day.

TABLE 2

| Rule | Trace Feature(s) | Time Slot |
|------|------------------|-----------|
| 1 | Program=program123 | 0:00-3:00, every day |
| 2 | Operation=operation1 | 0:00-4:00, every Saturday |
| 3 | Address=192.168.0.11 | 0:00-5:00, every day |
| 4 | UID=uid1 & Operation=operation1 | 0:00-6:00, every day |
| ... | ... | ... |

In some embodiments, a priority is determined for the data collection rule. The priority to the data collection rule is also comprised, e.g., in the data collection rule, and data of a subsequent transaction complying with the data collection rule is collected with a higher priority than data of another subsequent transaction complying with another data collection rule during a time slot shared by both data collection rules if the priority of the data collection rule is higher than the priority of the other data collection rule.

As an example, the priority of a data collection rule is determined based on the number of the affected transactions sharing trace features of the data collection rule. For example, if 1000 affected transactions share a same trace feature "Program=program123" in Rule 1, and 200 affected transactions share another same trace feature "Operation=operation1" in Rule 2, Rule 1 is assigned with a priority higher than Rule 2. As another example, a user and/or an administrator of transaction system 400 can set the priority for each data collection rule.

Table 3 shows one example of a plurality of rules comprising priority. As an example, the priority for Rule 1 is "High", and the priority for Rule 2 is "Medium", which means the data collection according to Rule 1 can be implemented prior to the data collection according to Rule 2. As a further example, if available resources for data collection can not satisfy resource requirements of data collection based on all valid rules in a specific time point, data collection based on lower priority rules may be abandoned before data collection based on higher priority rules. It shall be noted that the priorities "High", "Medium" and "Low" are for describing principles of aspects of the present invention, and less or more than these three levels of priorities can be assigned to the rules.

TABLE 3

| Rule | Trace Feature(s) | Priority |
|------|------------------|----------|
| 1 | Program=program123 | High |
| 2 | Operation=operation1 | Medium |
| 3 | Address=192.168.0.11 | Low |
| 4 | UID=uid1 & Operation=operation1 | Low |
| ... | ... | ... |

According to embodiments of the present invention, data of a subsequent transaction complying with the data collection rule is collected by problem diagnostic module 420.

A subsequent transaction is, for instance, a transaction executed by transaction processing module 410 after the one or more transaction exceptions occur. In response to detecting the subsequent transaction complying with at least one of the data collection rules, data of the subsequent transaction is collected. In some embodiments, a data block related to the subsequent transaction is detected, and one or more features of the subsequent transaction are determined based on the data block. If one or more features of the subsequent transaction matches with the one or more trace features of the data collection rule, the subsequent transaction can be thought of as complying with the data collection rule, and one or more contents in the data block related to the subsequent transaction can be collected.

In some embodiments, one or more features of the subsequent transaction matches with the one or more trace features may comprise: the one or more features of the subsequent transaction is the same as the one or more trace features of the data collection rule; or difference between the one or more features of the subsequent transaction and the one or more trace features of the data collection rule meets a preset criterion.

For example, the trace feature of Rule 1 is "Program=program123". If a subsequent transaction (for example, Subsequent Transaction 1) comprises a data field "Program" in its related data block and the value of the data field "Program" is assigned with "program123", Subsequent Transaction 1 can be thought of as having a feature matching with "Program=program123". In this example, Subsequent Transaction 1 complies with Rule 1, and data of Subsequent Transaction 1 can be collected. As another example, the trace feature of Rule 2 is "Operation=operation1". If a subsequent transaction (for example, Subsequent Transaction 2) comprises a data field "Operation" in its related data block and the value of the data field "Operation" is assigned with "operation1", Subsequent Transaction 2 complies with Rule 2, and data of Subsequent Transaction 2 can be collected.

As another example, the trace feature in Rule 3 is "Address=192.168.0.11", and the difference between another IP address "192.168.0.21" and "192.168.0.11" can be thought to meet a preset criterion (for example, in a same subnetwork). If a subsequent transaction (for example, Subsequent Transaction 3) comprises a data field "Address" in its related data block and the value of the data field "Address" is assigned with "192.168.0.21", Subsequent Transaction 3 complies with Rule 3, and data of Subsequent Transaction 3 can be collected. As another example, the trace features of Rule 4 are "UID=uid1 & Operation=operation1". If a subsequent transaction (for example, Subsequent Transaction 4) comprise both data fields "UID" and "Operation" in its related data block and the values of the data fields "UID" and "Operation" are assigned with "uid1" and "operation1" respectively, Subsequent Transaction 4 complies with Rule 4, and data of Subsequent Transaction 4 can be collected.

The collected data of the subsequent transaction can be stored in trace storage 440, which can be accessed by problem diagnostic module 420. If a transaction exception occurs later, the collected data stored in trace storage 440 can be analyzed by diagnostic module 420 to determine a failure reason of the later transaction exception. It shall be understood that the analysis can be implemented by many now-known or to be developed techniques. For example, an expert system can be used to analyze the collected data. The failure reason can also be displayed to users of transaction system 400, and the users can optimize transaction system 400 based on the failure reason. In another embodiment, the failure reason can be used by a system to automatically perform one or more actions to improve or optimize transaction system 400 to improve the transaction system, itself.

In some embodiments, the data collection can be disabled in response to enough data having been collected. In some other embodiments, if a data collection rule becomes invalid, data collection of a subsequent transaction complying with this invalid rule can be disabled.

According to embodiments of the present invention, a subsequent transaction running in transaction systems complying with a data collection rule can be detected and traced, and there is no need to trace irrelevant transactions, thereby reducing resource consuming of problem diagnostic and decreasing problem diagnostic duration.

Figure 7:
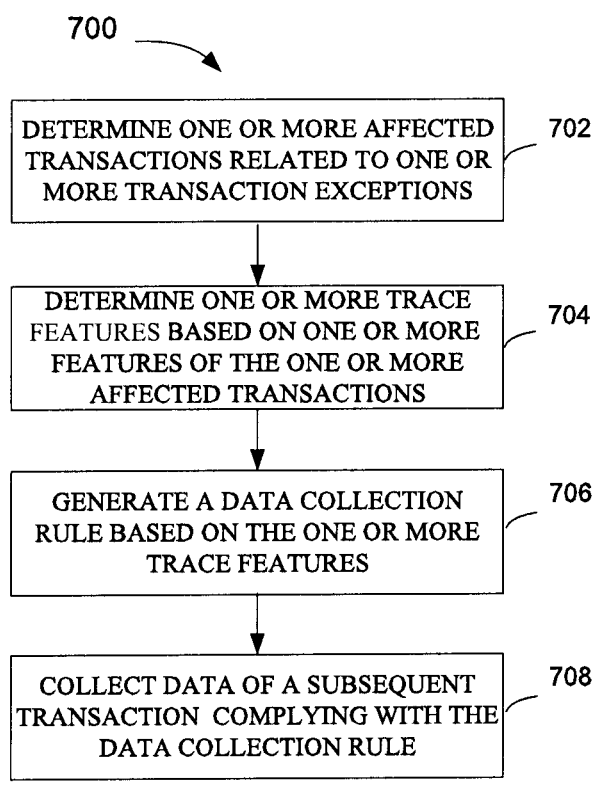
FIG. 7 depicts a flow chart of an example method for data collection according to an embodiment of the present invention.

A method 700 for data collection according to embodiments of the invention are discussed with reference to FIG. 7. Method 700 can be implemented by the cloud computing node 10 in FIG. 2. Method 700 can also be implemented by any transaction system, such as transaction system 400. It shall be noted that method 700 is only illustrative and is not intended to suggest any limitation as to the scope of use or functionality of embodiments of the present invention described herein.

At step 702, one or more affected transactions related to one or more transaction exceptions are determined. Then, at step 704, one or more trace features are determined based on one or more features of the one or more affected transactions. At step 706, a data collection rule is generated based on the one or more trace features. At step 708, data of a subsequent transaction complying with the data collection rule is collected.

One or more aspects are inextricably tied to computer technology, and provide improvements to one or more processing systems.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, based on a transaction exception resulting from execution of a transaction, multiple affected transactions that are affected by the transaction exception, wherein a transaction is a unit of work performed within a system to satisfy a request, and wherein each affected transaction of the multiple affected transactions is affected by the transaction exception resulting from execution of the transaction;
    determining one or more features of the multiple affected transactions, wherein a feature of an affected transaction of the multiple affected transactions comprises a name of a data field in a data block corresponding to the affected transaction and a value of the data field;
    determining one or more trace features based on the one or more features determined for the multiple affected transactions, wherein the determining a trace feature of the one or more trace features comprises selecting, from the one or more features determined for the multiple affected transactions, a selected feature that is in common for the multiple affected transactions in that each affected transaction of the multiple affected transactions has the selected feature and that selected feature for each affected transaction has a same data field with a same name and a same value and that selected feature is different for one or more successful transactions that occur concurrently with the multiple affected transactions in that at least a value of the same data field is different for the one or more successful transactions, the one or more trace features being one or more selected features common to the multiple affected transactions, and wherein the determining the one or more trace features further comprises:
        determining the one or more successful transactions that occur concurrently with the multiple affected transactions; and
        determining at least one feature in common with the multiple affected transactions that is different from at least one corresponding feature of the one or more successful transactions to be included in the one or more trace features;
    generating, by one or more processors, a data collection rule based on the one or more trace features that are in common with the multiple affected transactions, the data collection rule including the one or more trace features that are in common with the multiple affected transactions; and collecting data of a subsequent transaction complying with the data collection rule.

2. The computer-implemented method of claim 1, further comprising:
predicting available resources for the collecting;
predicting resources requested for tracing subsequent transactions having different sets of features, wherein each of the different sets of features comprises at least one feature selected from the one or more features of the multiple affected transactions; and
determining, based on resources requested for tracing subsequent transactions having a set of features being satisfied by the available resources, the set of features to be included in the one or more trace features.

3. The computer-implemented method of claim 1, wherein the collecting comprises collecting data of a subsequent transaction comprising one or more features matching with the one or more trace features.

4. The computer-implemented method of claim 1, further comprising:
determining a time slot for the data collection rule; and
adding the time slot to the data collection rule, wherein data of a subsequent transaction complying with the data collection rule is collected during the time slot.

5. The computer-implemented method of claim 1, further comprising:
determining a priority for the data collection rule; and
adding the priority to the data collection rule, wherein data of a subsequent transaction complying with the data collection rule is collected with a higher priority than data of another subsequent transaction complying with another data collection rule during a time slot shared by both the data collection rule and the other data collection rule based on the priority of the data collection rule being higher than the priority of the other data collection rule.

6. The computer-implemented method of claim 1, further comprising:
disabling the collecting based on detecting the data collection rule is invalid.

7. The computer-implemented method of claim 1, wherein a transaction exception of the one or more transaction exceptions comprises at least one transaction exception selected from a group consisting of: transaction recovery, transaction rollback, database rollback, program abend, and transaction logical failure.

8. The computer-implemented method of claim 1, wherein the one or more features of the multiple affected transactions comprise at least one feature selected from a group consisting of: user identifiers, account identifiers, operations, proxy identifiers, programs, domain stacks, filenames, and addresses related to the one or more affected transactions.

9. A computer system comprising:
a processor; and
a memory coupled to the processor, the computer system configured to perform a method, the method comprising:
determining, based on a transaction exception resulting from execution of a transaction, multiple affected transactions that are affected by the transaction exception, wherein a transaction is a unit of work performed within a system to satisfy a request, and wherein each affected transaction of the multiple affected transactions is affected by the transaction exception resulting from execution of the transaction;
determining one or more features of the multiple affected transactions, wherein a feature of an affected transaction of the multiple affected transactions comprises a name of a data field in a data block corresponding to the affected transaction and a value of the data field;
determining one or more trace features based on the one or more features determined for the multiple affected transactions, wherein the determining a trace feature of the one or more trace features comprises selecting, from the one or more features determined for the multiple affected transactions, a selected feature that is in common for the multiple affected transactions in that each affected transaction of the multiple affected transactions has the selected feature and that selected feature for each affected transaction has a same data field with a same name and a same value and that selected feature is different for one or more successful transactions that occur concurrently with the multiple affected transactions in that at least a value of the same data field is different for the one or more successful transactions, the one or more trace features being one or more selected features common to the multiple affected transactions, and wherein the determining the one or more trace features further comprises:
determining the one or more successful transactions that occur concurrently with the multiple affected transactions; and
determining at least one feature in common with the multiple affected transactions that is different from at least one corresponding feature of the one or more successful transactions to be included in the one or more trace features;
generating a data collection rule based on the one or more trace features that are in common with the multiple affected transactions, the data collection rule including the one or more trace features that are in common with the multiple affected transactions; and
collecting data of a subsequent transaction complying with the data collection rule.

10. The computer system of claim 9, wherein the one or more features of the multiple affected transactions comprise at least one feature selected from a group consisting of: user identifiers, account identifiers, operations, proxy identifiers, programs, domain stacks, filenames, and addresses related to the one or more affected transactions.

11. The computer system of claim 9, further comprising:
predicting available resources for the collecting;
predicting resources requested for tracing subsequent transactions having different sets of features, wherein each of the different sets of features comprises at least one feature selected from the one or more features of the multiple affected transactions; and
determining, based on resources requested for tracing subsequent transactions having a set of features being satisfied by the available resources, the set of features to be included in the one or more trace features.

12. The computer system of claim 9, wherein the collecting comprises collecting data of a subsequent transaction comprising one or more features matching with the one or more trace features.

13. The computer system of claim 9, wherein the method further comprises:
  determining a time slot for the data collection rule; and
  adding the time slot to the data collection rule, wherein data of a subsequent transaction complying with the data collection rule is collected during the time slot.

14. The computer system of claim 9, wherein the method further comprises:
  determining a priority for the data collection rule; and
  adding the priority to the data collection rule, wherein data of a subsequent transaction complying with the data collection rule is collected with a higher priority than data of another subsequent transaction complying with another data collection rule during a time slot shared by both the data collection rule and the other data collection rule based on the priority of the data collection rule being higher than the priority of the other data collection rule.

15. A computer program product comprising a computer readable storage medium having program instructions embodied therewith, the program instructions executable by a processor to perform a method comprising:
  determining, based on a transaction exception resulting from execution of a transaction multiple affected transactions that are affected by the transaction exception, wherein a transaction is a unit of work performed within a system to satisfy a request, and wherein each affected transaction of the multiple affected transactions is affected by the transaction exception resulting from execution of the transaction;
  determining one or more features of the multiple affected transactions, wherein a feature of an affected transaction of the multiple affected transactions comprises a name of a data field in a data block corresponding to the affected transaction and a value of the data field;
  determining one or more trace features based on the one or more features determined for the multiple affected transactions, wherein the determining a trace feature of the one or more trace features comprises selecting, from the one or more features determined for the multiple affected transactions, a selected feature that is in common for the multiple affected transactions in that each affected transaction of the multiple affected transactions has the selected feature and that selected feature for each affected transaction has a same data field with a same name and a same value and that selected feature is different for one or more successful transactions that occur concurrently with the multiple affected transactions in that at least a value of the same data field is different for the one or more successful transactions, the one or more trace features being one or more selected features common to the multiple affected transactions, and wherein the determining the one or more trace features further comprises:
    determining the one or more successful transactions that occur concurrently with the multiple affected transactions; and
    determining at least one feature in common with the multiple affected transactions that is different from at least one corresponding feature of the one or more successful transactions to be included in the one or more trace features;
  generating a data collection rule based on the one or more trace features that are in common with the multiple affected transactions, the data collection rule including the one or more trace features that are in common with the multiple affected transactions; and
  collecting data of a subsequent transaction complying with the data collection rule.

16. The computer program product of claim 15, wherein the one or more features of the multiple affected transactions comprise at least one feature selected from a group consisting of: user identifiers, account identifiers, operations, proxy identifiers, programs, domain stacks, filenames, and addresses related to the one or more affected transactions.

17. The computer program product of claim 15, further comprising:
  predicting available resources for the collecting;
  predicting resources requested for tracing subsequent transactions having different sets of features, wherein each of the different sets of features comprises at least one feature selected from the one or more features of the multiple affected transactions; and
  determining, based on resources requested for tracing subsequent transactions having a set of features being satisfied by the available resources, the set of features to be included in the one or more trace features.

18. The computer program product of claim 15, wherein the collecting comprises collecting data of a subsequent transaction comprising one or more features matching with the one or more trace features.

19. The computer program product of claim 16, wherein the method further comprises:
  determining a priority for the data collection rule; and
  adding the priority to the data collection rule, wherein data of a subsequent transaction complying with the data collection rule is collected with a higher priority than data of another subsequent transaction complying with another data collection rule during a time slot shared by both the data collection rule and the other data collection rule based on the priority of the data collection rule being higher than the priority of the other data collection rule.

20. The computer program product of claim 15, wherein the method further comprises:
  determining a time slot for the data collection rule; and
  adding the time slot to the data collection rule, wherein data of a subsequent transaction complying with the data collection rule is collected during the time slot.

* * * * *